United States Patent
So et al.

(10) Patent No.: US 9,712,596 B2
(45) Date of Patent: *Jul. 18, 2017

(54) METHOD AND APPARATUS FOR UPDATING USER INTERFACE

(71) Applicant: Samsung Electronics Co., Ltd., Gyeonggi-do (KR)

(72) Inventors: Young-Wan So, Gyeonggi-do (KR); Young-Sun Ryu, Gyeonggi-do (KR); Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 364 days.

This patent is subject to a terminal disclaimer.

(21) Appl. No.: 14/314,936

(22) Filed: Jun. 25, 2014

(65) Prior Publication Data

US 2014/0310609 A1  Oct. 16, 2014

Related U.S. Application Data

(63) Continuation of application No. 12/981,014, filed on Dec. 29, 2010, now Pat. No. 8,793,310.

(30) Foreign Application Priority Data

Oct. 15, 2010 (KR) .......................... 10-2010-0100827

(51) Int. Cl.
*H04L 29/08* (2006.01)
*G06F 9/54* (2006.01)

(52) U.S. Cl.
CPC ............ *H04L 67/025* (2013.01); *G06F 9/542* (2013.01); *G06F 2209/545* (2013.01)

(58) Field of Classification Search
None
See application file for complete search history.

(56) References Cited

U.S. PATENT DOCUMENTS

| | | | |
|---|---|---|---|
| 8,082,507 B2 | 12/2011 | Speicher et al. | |
| 8,793,310 B2 * | 7/2014 | So | G06F 9/542 |
| | | | 709/203 |
| 2002/0120721 A1 | 8/2002 | Eilers et al. | |
| 2006/0174026 A1 | 8/2006 | Robinson et al. | |
| 2007/0174300 A1 * | 7/2007 | Kim | G06F 9/542 |
| 2008/0155427 A1 * | 6/2008 | Leblay | H04L 67/36 |
| | | | 715/744 |
| 2008/0184128 A1 | 7/2008 | Swenson et al. | |
| 2009/0265648 A1 | 10/2009 | Ryu et al. | |

(Continued)

OTHER PUBLICATIONS

CEA Standard, Web-based Protocol and Framework for Remote User Interface on UPnP Networks and the Internet (Web4CE), CEA-2014-A, Jul. 2007.

*Primary Examiner* — Yaotang Wang
(74) *Attorney, Agent, or Firm* — The Farrell Law Firm, P.C.

(57) ABSTRACT

Methods, apparatuses, and systems for updating a User Interface (UI) in a Remote UI (RUI) client are described. Upon detecting a change in its capability, the RUI client stores a UI state of a UI page and requests a RUI server to update the UI page according to the changed capability. The RUI client receives a UI page updated according to the changed capability from the RUI server, where the stored UI state is reflected in the updated UI page, and the RUI client renders the UI state-reflected updated UI page.

15 Claims, 12 Drawing Sheets

(56) References Cited

U.S. PATENT DOCUMENTS

2009/0282096 A1\* 11/2009 Kamrowski ........ H04L 67/1095
                                              709/203
2010/0077058 A1   3/2010 Messer
2011/0055716 A1   3/2011 Kim et al.
2011/0131505 A1   6/2011 Park et al.

\* cited by examiner

METHOD AND APPARATUS FOR UPDATING USER INTERFACE

PRIORITY

This application claims priority under 35 U.S.C. §120 to U.S. application Ser. No. 12/981,014, filed on Dec. 29, 2010 and presently in condition for allowance, which, in turn, claimed priority under 35 U.S.C. §119(a) to a Korean Patent Application filed in the Korean Intellectual Property Office on Oct. 15, 2010 and assigned Serial No. 10-2010-0100827, the entire disclosures of each of which are incorporated herein by reference.

BACKGROUND OF THE INVENTION

1. Field of the Invention

The present invention relates generally to a Remote User Interface (RUI) system providing User Interfaces (UIs) to users in remote locations, and more particularly, to an apparatus and method for dynamically updating UIs provided to users in an RUI system.

2. Description of the Related Art

Much study has been conducted to improve home network technologies by several industry standards organizations such as Digital Living Network Alliance (DLNA), Home Audio-Video Interoperability (HAVi), and Universal Plug and Play (UPnP).

In a home network, Remote User Interface (RUI) technology may be used to allow one device to control functions of other devices. Briefly, the RUI technology, based on a client-server architecture, enables an RUI Client (RUIC) to fetch one or more UIs from an RUI Server (RUIS) so that its user may control the RUIS using the UI on the RUIC.

FIG. 1 illustrates a method by which an RUIC controls an RUIS using an RUI page and control information provided by the RUIS according to the prior art.

Referring to FIG. 1, an RUIC 110 transmits its capability information to an RUIS 100 in step 101, and the RUIS 100 delivers an RUI page and content created according to the capability information received from the RUIC 110, to the RUIC 110 in step 102, and displays the content and UI page on a screen of the RUIC 110.

Generally, the capability information transmitted by the RUIC 110 mainly includes static values such as a screen resolution and device performance. However, the device performance may include factors which vary with time such as a battery state, a network state, a memory capacity, detachable input devices, a Central Processing Unit (CPU), and a Graphic Processing Unit (GPU). Specifically, the CPU and GPU may have difficulties in smoothly rendering high-definition UI pages if their usage rates increase. However, there is no way to provide an RUIC with UI pages in which frequent changes in the performance of such a device is reflected.

Upon a change in the capability, a user may retransmit the changed capability information and re-fetch an updated UI page. In this case, however, the UI user must re-consume the content from the beginning, inconveniencing the user.

SUMMARY OF THE INVENTION

An aspect of the present invention is to address at least the above-mentioned problems and/or disadvantages and to provide at least the advantages described below. Accordingly, an aspect of the embodiments of the present invention is to provide an apparatus and method for dynamically updating a UI despite frequent change in capability of an RUIC in a process of controlling an RUIS by the RUIC.

In accordance with an aspect of the present invention, there is provided a method for updating a User Interface (UI) by a Remote UI (RUI) client in an RUI system providing a UI, including requesting a RUI server to update a UI page in response to detecting a change in capability of the RUI client; receiving, from the RUI server, a new UI page updated according to the changed capability; comparing a UI state of the new UI page with a UI state of the UI page; if there are attributes to be added or deleted as a result of the comparison, adding or deleting the attributes in the new UI page; and rendering the new UI page.

In accordance with another aspect of the present invention, there is provided a method for updating a User Interface (UI) by a Remote UI (RUI) server in an RUI system providing a UI, including receiving an update request for a UI page, where the update request includes a changed capability of an RUI client and where the update request was transmitted by a RUI client; determining whether there are items to be updated in the UI page in response to a change in capability of the RUI client; and, if there are items to be updated, updating the UI page according to the changed capability of the RUI client, and transmitting the updated UI page to the RUI client, wherein, upon receiving the updated UI page transmitted by the RUI server, the RUI client compares a UI state of the received updated UI page with a UI state stored by the RUI client when the change in capability was detected and, if there are attributes to be added or deleted as a result of the comparison, adds or deletes the attributes in the received updated UI page.

In accordance with yet another aspect of the present invention, there is provided a method for updating a User Interface (UI) by a Remote UI (RUI) client in an RUI system providing a UI, including sending a request to the RUI server to update a UI page in response to detecting a change in capability of the RUI client; receiving a new UI page from the RUI server, wherein the RUI server had updated the UI page according to the changed capability in the request and reflecting a UI state of the UI page in the request in the updated UI page by comparing a UI state of the updated UI page with the UI state of the UI page in the request and, if there are attributes to be added or deleted as a result of the comparison, adding or deleting the attributes in the updated UI page; and rendering the new UI page.

In accordance with yet another aspect of the present invention, there is provided a method for updating a User Interface (UI) by a Remote UI (RUI) server in an RUI system providing a UI, including receiving, from an RUI client, an update request for a UI page, where the update request includes a changed capability of the RUI client and a UI state of the UI page when the RUI client detected the changed capability; determining whether there are items to be updated in the UI page in response to the changed capability of the RUI client; and, if there are items to be updated, updating the UI page according to the changed capability of the RUI client, applying the UI state included in the update request to the updated UI page by comparing a UI state of the updated UI page with the UI state included in the request and, if there are attributes to be added or deleted as a result of the comparison, adding or deleting the attributes in the updated UI page, and transmitting the UI-state-applied updated UI page to the RUI client.

In accordance with still another aspect of the present invention, there is provided a Remote User Interface (RUI) client apparatus for updating a User Interface (UI) in an RUI system providing a UI, including a web browser which requests an RUI server to update a UI page in response to detecting a change in capability of an RUI client, receives a new UI page updated according to the changed capability from an RUI server, and renders the new UI page; and a controller that compares a UI state of the new UI page with a UI state of the UI page stored in a UI state storage and, if there are attributes to be added or deleted as a result of the comparison, adds or deletes the attributes in the new UI page.

In accordance with still another aspect of the present invention, there is provided a Remote User Interface (RUI) server apparatus for updating a User Interface (UI) in an RUI system providing a UI, including a web server which receives an update request from a RUI client for a UI page, and sends a response to the update request to the RUI client, where the update request includes a changed capability of the RUI client and where the update request was transmitted by the RUI client; and a controller that determines whether there are items to be updated in the UI page in response to a change in capability of the RUI client, updates the UI page according to the changed capability of the RUI client, and, if there are items to be updated, transmits the updated UI page to a web browser, wherein, upon receiving the updated UI page transmitted by the RUI server, the RUI client compares a UI state of the received updated UI page with a UI state stored by the RUI client when the change in capability was detected, and, if there are attributes to be added or deleted as a result of the comparison, adds or deletes the attributes in the received updated UI page.

In accordance with still another aspect of the present invention, there is provided a Remote User Interface (RUI) client apparatus for updating a User Interface (UI) in an RUI system providing a UI, including a controller which requests a RUI server to update a UI page in response to detecting a change in capability of the RUI client; and a web browser that receives a new UI page from the RUI server, wherein the RUI server updates the UI page according to a changed capability in the request and reflecting a UI state of the UI page included in the request in the updated UI page by comparing a UI state of the updated UI page with the UI state of the UI page included in the request and, if there are attributes to be added or deleted as a result of the comparison, adding or deleting the attributes in the updated UI page.

In accordance with still another aspect of the present invention, there is provided a Remote User Interface (RUI) server apparatus for updating a User Interface (UI) in an RUI system providing a UI, including a web server which receives an update request from an RUI client for a UI page, and sends a response to the update request to the RUI client, where the update request includes a changed capability of the RUI client and a UI state of the UI page when the RUI client detected the changed capability; and a controller that determines whether there are items to be updated in the UI page in response to detecting a change in capability of the RUI client, updates the UI page according to the changed capability of the RUI client if there are items to be updated, applies the UI state included in the update request to the updated UI page by comparing the UI state of the updated UI page with the UI state included in the update request and, if there are attributes to be added or deleted as a result of the comparison, adding or deleting the attributes in the updated UI page, and delivers the UI-state-applied UI page to the web server.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS
OF THE PRESENT INVENTION

Embodiments of the present invention will now be described in detail with reference to the accompanying drawings. In the following description, specific details such as detailed configuration and components are provided to assist the overall understanding of the embodiments of the present invention. Therefore, it should be apparent to those skilled in the art that various changes and modifications of the embodiments described herein can be made without departing from the scope and spirit of the invention. Additionally, descriptions of well known functions and constructions are omitted for clarity and conciseness.

The present invention provides a method for dynamically updating a UI page according to the variable capability of a RUIC. To accomplish this, upon detecting a change in its capability, an RUIC stores the current UI state information, sends a re-request for a UI page to an RUIS, and restores the UI state having been used by the user by reflecting the UI state information in a UI page received from the RUIS, thereby providing a UI page matching the changed capability to the user.

Figure 1:
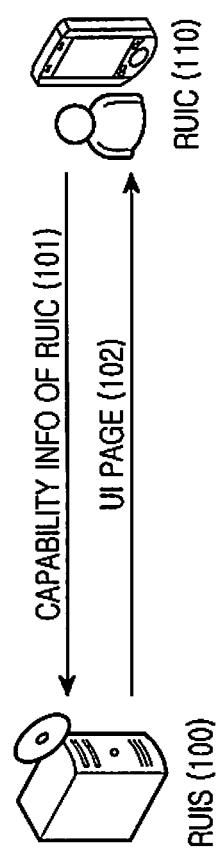
FIG. 1 illustrates how an RUIS delivers an RUI page to an RUIC according to the prior art.
Figure 2A:
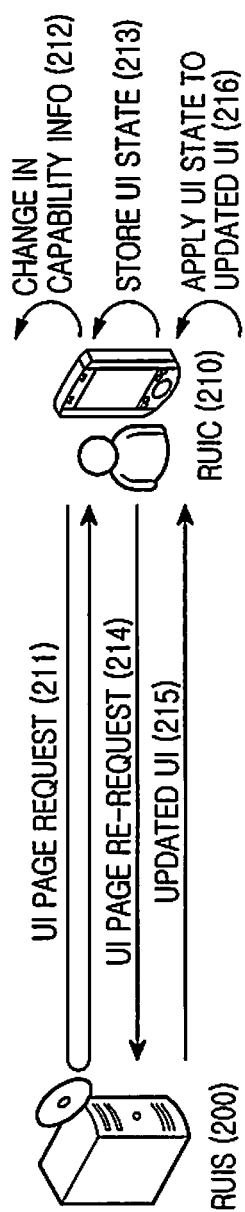
FIGS. 2A to 2C illustrate dynamic UI update methods according to an embodiment of the present invention.
Figure 2B:
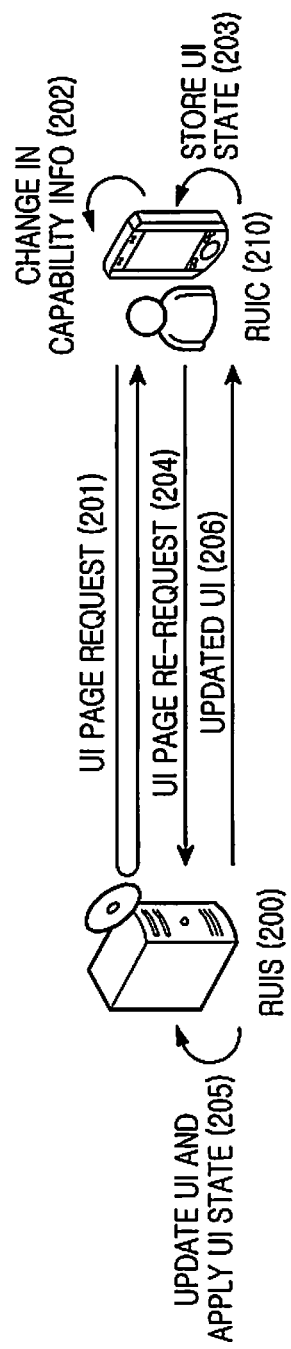
Figure 2C:
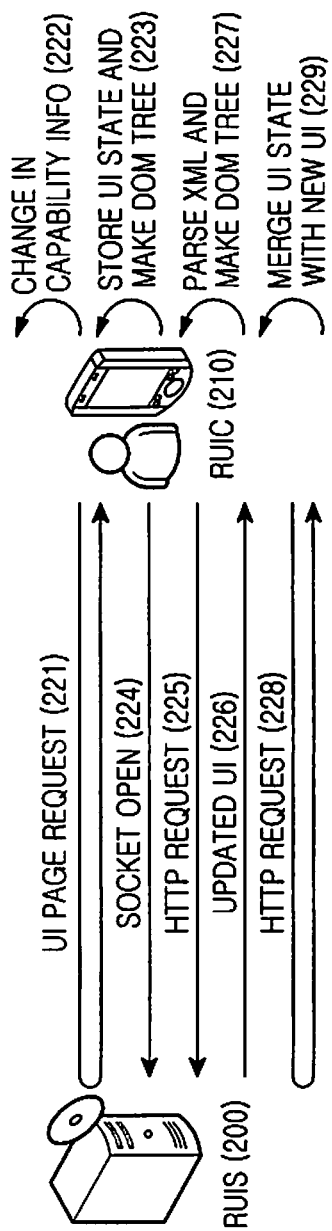

FIGS. 2A to 2C illustrate dynamic UI update methods according to an embodiment of the present invention.

The proposed dynamic UI update methods may be classified into a method of re-fetching the entire UI page matching a new capability and a method of partially updating a UI page in accordance with the new capability.

The method of re-fetching the entire UI page may be classified again into a method of storing UI state information in an RUIC and allowing the RUIC to restore the finally updated UI using the stored UI state information, and a method of sending, by an RUIC, UI state information along with a UI page request message when requesting a UI page from the RUIS.

FIG. 2A illustrates a method of storing UI state information in a RUIC and allowing the RUIC to restore the finally updated UI using the UI state information according to a first embodiment of the present invention.

Referring to FIG. 2A, an RUIC 210 sends a request for a UI page to an RUIS 200 and receives the UI page from the RUIS 200 in step 211. Thereafter, upon detecting a change in its capability information in step 212, the RUIC 210 stores the current UI state in step 213, and sends a re-request for a UI page to the RUIS 200 in step 214. The RUIC 210 transmits the changed capability information.

Upon receiving the UI page re-request message, the RUIS 200 updates the UI page according to the changed capability information received from the RUIC 210 and transmits the updated UI page to the RUIC 210 in step 215. Then, the RUIC 210 restores the UI by reflecting the stored UI state information in the updated UI received from the RUIS 200 in step 216.

FIG. 2B illustrates a method of transmitting, by an RUIC, UI state information along with a UI page request message when requesting a UI page from an RUIS, and re-fetching the entire UI page, which is updated according to a new capability and in which the UI state is reflected, according to a second embodiment of the present invention.

Referring to FIG. 2B, the RUIC 210 sends a request for a UI page to the RUIS 200 and receives the UI page from the RUIS 200 in step 201. Thereafter, upon detecting a change in its capability information in step 202, the RUIC 210 stores the current UI state in step 203 and sends a re-request for a UI page to the RUIS 200 in step 204. The RUIC 210 transmits the changed capability information and the current UI state information.

Upon receiving the UI page re-request, the RUIS 200 updates the UI page according to the changed capability information received from the RUIC 210 and reflects the UI state information of the RUIC 210 in the updated UI page in step 205, and then transmits the updated UI page to the RUIC 210 in step 206.

FIG. 2C illustrates a method of transmitting by an RUIS a UI page partially updated in accordance with a new capability of an RUIC, to the RUIC according to a third embodiment of the present invention, in which elements of the UI page are updated using XML Http Request (XHR).

Referring to FIG. 2C, the RUIC 210 sends a request for a UI page to the RUIS 200 and receives the UI page from the RUIS 200 in step 221. Thereafter, upon detecting a change in its capability information in step 222, the RUIC 210 stores the current UI state and makes a Document Object Model (DOM) tree in step 223, opens a socket to the RUIS 200 in step 224, and sends a request for a UI page using an HTTP command in step 225.

After updating the UI according to the changed capability, the RUIS 200 transmits the updated UI to the RUIC 210 in step 226. Upon receiving the updated UI, the RUIC 210 parses an eXtensible Markup Language (XML) document of the updated UI and makes a DOM tree to find out its structure in step 227, re-requests elements (e.g., a button image, or the like) needed to be updated on an individual basis and fetches the elements from the RUIS 200 in step 228, and merges the stored UI state with the updated elements in step 229.

Figure 3:
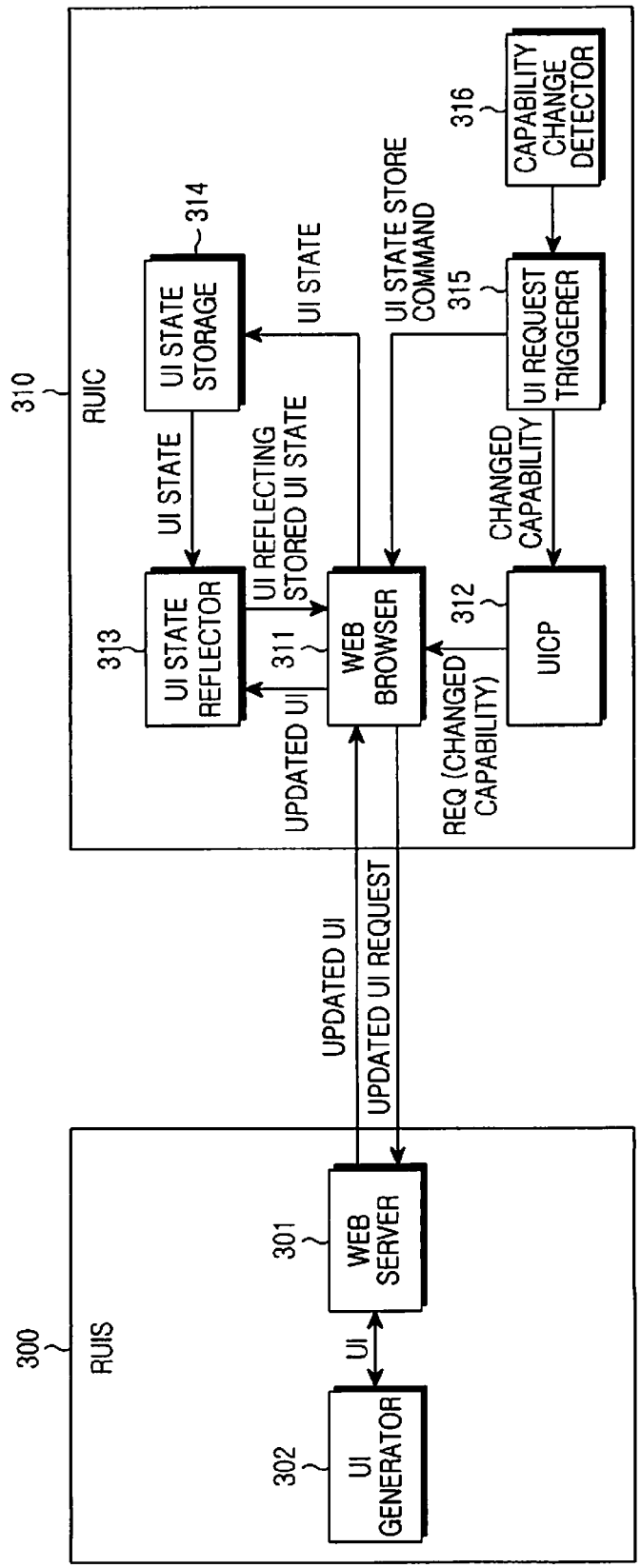
FIG. 3 illustrates a configuration of an RUI system according to an embodiment of the present invention.

FIG. 3 illustrates a configuration of an RUI system, according to an embodiment of the present invention.

Referring to FIG. 3, the RUI system includes an RUIS 300, which is a device for providing an RUI(s), and an RUIC 310, which is a device for receiving an RUI from the RUIS 300, displaying the received RUI on its screen, and controlling the RUIS 300 in a remote location through interaction with a user.

The RUIS 300 includes a web server 301 and a UI generator 302. The web server 301 transmits UI data in the form of eXtensible HyperText Markup Language (XHTML) or XML to the RUIC 310, and the UI generator 302 provides a UI corresponding to the capability of the RUIC 310.

The RUIC 310 includes a web browser 311, a User Interface Control Point (UICP) 312, a UI state reflector 313, a UI state storage 314, a UI update request triggerer (or UI request triggerer) 315, and a capability change detector 316.

The web browser 311 receives UI data in the form of XHTML and renders the received UI data. The UICP 312 is a logical point for performing capability matching between the RUIS 300 and the RUIC 310 and making a connection between them. While FIG. 3 shows that the UICP 312 is situated in the RUIC 310, the UICP 312 may be mounted in the RUIS 300, or may be situated outside the RUIS 300 and the RUIC 310. The UI state reflector 313 re-fetches the stored state information having been used by the user, such as a cursor position, a play position and a screen configuration, and reflects the re-fetched state information in an updated UI page received from the RUIS 300. The UI state storage 314 stores the state information having been used by the user, such as a cursor position, a play position and a screen configuration, upon request from the web browser 311. The UI request triggerer 315 determines whether there is a need to update a UI, upon detecting a change in capability of the RUIC 310. If there is a need for the update, the UI request triggerer 315 delivers the updated capability to the UICP 312, sends a request for an updated UI to the RUIS 300, and commands the web browser 311 to store the current UI state. The capability change detector 316 detects any changes in capability of the RUIC 310.

Figure 4A:
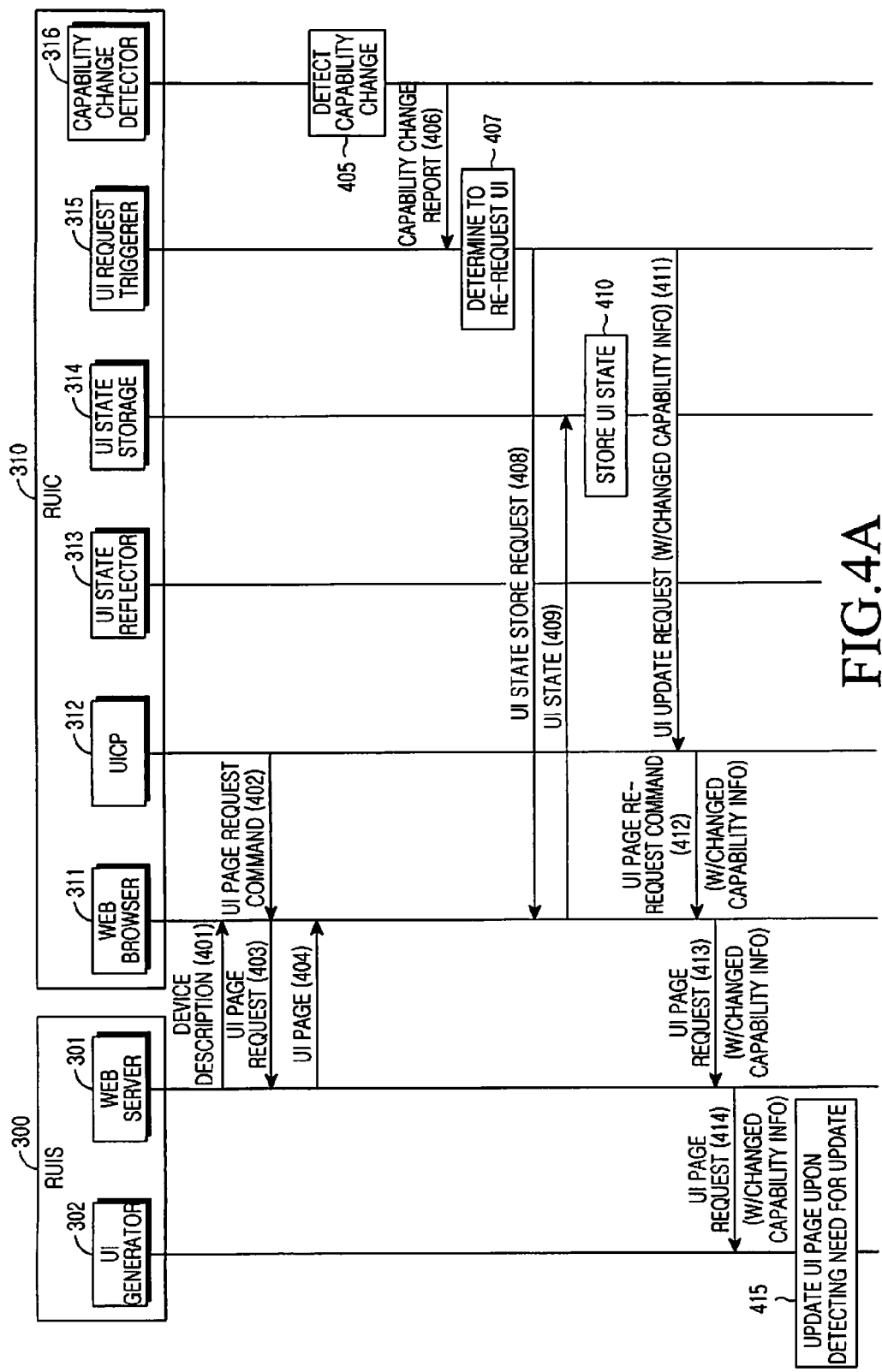
FIGS. 4A and 4B illustrate a procedure in which a UI page is dynamically updated upon a change in capability of an RUIC according to an embodiment of the present invention.
Figure 4B:
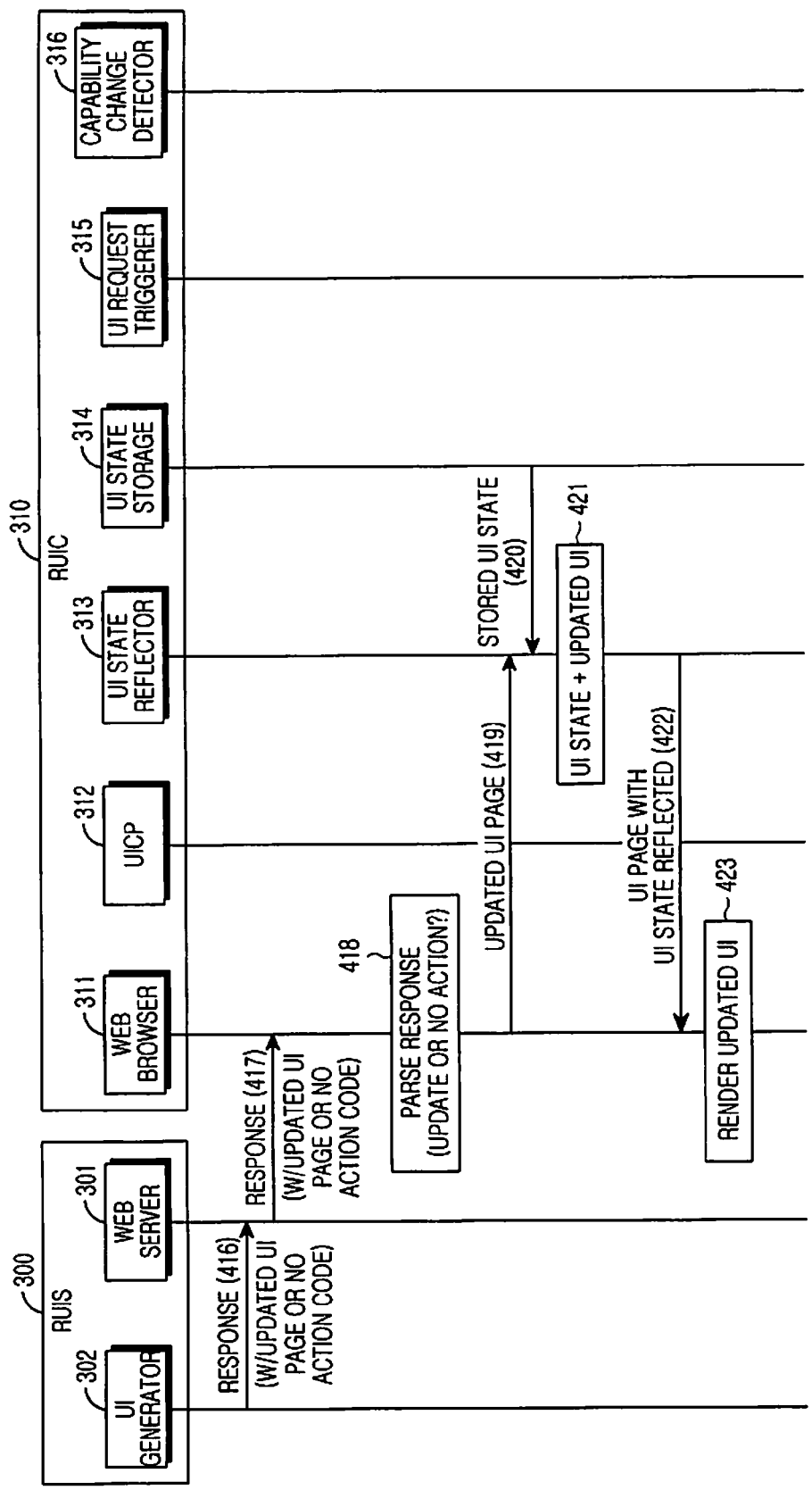

FIGS. 4A and 4B illustrate a procedure in which a UI page is dynamically updated based on a change in capability of an RUIC according to a first embodiment of the present invention.

Referring to FIGS. 4A and 4B, in steps 401 to 404, the web browser 311 in the RUIC 310 receives a device description provided by the web server 301 in the RUIS 300, and under control of the UICP 312, sends a request for a UI page to the web server 301 in the RUIS 300, receives the UI page from the web server 301, and renders the received UI page.

In steps 405 and 406, the capability change detector 316 detects any change in capability of the RUIC 310, and sends the detection results to the UI request triggerer 315. Upon a change of device capability, the UI request triggerer 315 determines in step 407 whether to receive a new UI updated to be compatible with the changed capability. If a determination is made to update the UI, the UI request triggerer 315 commands the web browser 311 to store the current UI state information in the UI state storage 314 in step 408. In steps 409 and 410, the UI state information is read from the web browser 311 and stored in the UI state storage 314.

In step 411, the UI request triggerer 315 delivers the changed capability information to the UICP 312 so that the UICP 312 may re-request a UI matching the changed capability. In step 412, the UICP 312 commands the web browser 311 to send a re-request for a UI page to the RUIS 300 using the changed capability information, and this request is forwarded to the web server 301 and the UI generator 302 in the RUIS 300 in steps 413 and 414.

In step 415, the UI generator 302 determines its availability of providing a UI page agreeable with the capability, based on the new capability information received from the RUIC 310. In steps 416 and 417, the UI generator 302 sends a response message corresponding to the availability to the RUIC 310 through the web server 301. If it is possible to provide an updated UI page, the UI generator 302 updates a UI page, and sends the updated UI page together with the response message. However, if the update of a UI page is not required or is impossible, the UI generator 302 sends a proper HTTP error code as a response message.

If it is not specified that the request is an update request for the received existing UI page, unnecessary process is performed in which despite unnecessity of the UI update, the RUIS 300 always sends a UI page along with a response message and the web browser 311 in the RUIC 310 re-renders the received UI page. To prevent this unnecessary process, the RUIC 310 may record both the existing capability information and the new capability information in an HTTP message requesting a UI page, or the RUIC 310 may send only the new capability information along with the HTTP message, compare a received new UI page with the existing UI page being rendered, and newly render only the changed part on the web browser 311 on a selective basis.

Upon receiving the response to the UI page re-request from the RUIS 300, the web browser 311 in the RUIC 310 parses the received response in step 418, and if an updated UI page has been received, the web browser 311 transmits the updated UI page to the UI state reflector 313 in step 419 to reflect the stored UI state in it before rendering the UI page.

If the UI state is not reflected, as the state of the UI page having been used thus far is completely reset, the user may view the UI page again starting from the initial screen. To prevent this, upon receiving a new UI page from the RUIS 300, the web browser 311 reflects the UI state stored in the UI state storage 314 in the newly received UI page by means of the UI state reflector 313, before rendering.

That is, in steps 420 and 421, the UI state reflector 313 reflects the UI state read from the UI state storage 314 in the updated UI received from the web browser 311 by merging them.

In steps 422 and 423, the updated UI page with UI state reflected in it is delivered from the UI state reflector 313 to the web browser 311, and then rendered on the web browser 311. Additionally, if an error response indicating that an update would be unnecessary or impossible is received in step 418, the web browser 311 maintains the current state without taking any action.

If an RUIS updates a UI page, reflects UI state information of an RUIC in the updated UI page, and transmits the UI state-reflected updated UI page to the RUIC as in the second embodiment of the present invention described in FIG. 2B, the UI state reflector 313 is located in the RUIS 300. In this case, in steps 412 to 414, the UI state information may be delivered to the RUTS 300. Then, the RUIC 310 does not perform steps 419 to 422, and the web browser 311 in the RUIC 310 receives the UI state-reflected updated UI page from the RUIS 300 and immediately renders the received UI page in step 423.

Figure 5:
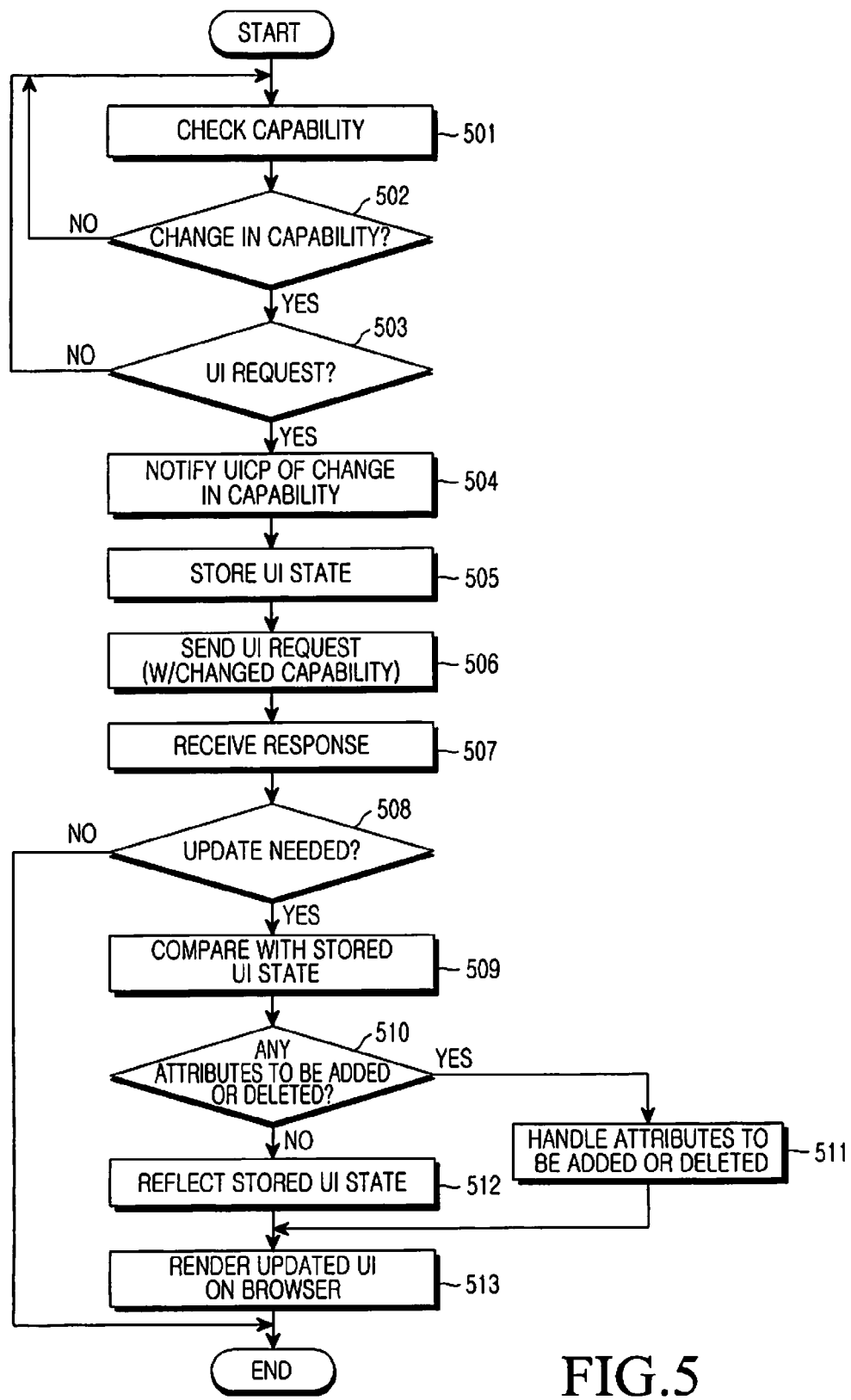
FIG. 5 is a flowchart illustrating an operation of an RUIC according to a first embodiment of the present invention.

FIG. 5 illustrates an operation of an RUIC according to the first embodiment of the present invention.

Referring to FIG. 5, the RUIC checks for any change in capability in step 501. Upon detecting a change in capability in step 502, the RUIC determines in step 503 whether to update a UI to match the changed capability. If it is determined that the UI must be updated, the RUIC notifies a UICP of the changed device capability in step 504, and stores the current UI state in step 505. In step 506, the RUIC sends a re-request for a UI page to an RUIS using the changed device capability information. If there is a change in capability in step 502 or if there is no need to update the UI in step 503, the RUIC returns to the beginning.

The RUIC receives a response to the UI request in step 507, and determines in step 508 whether there is a need to update the UI page by parsing the received response. If it is determined that there is a need for the update as an updated UI page is received as the response, the RUIC compares the updated UI page with the stored UI state in step 509, and determines in, step 510, whether there are any attributes to be added or deleted.

If there attributes to be added or deleted, the RUIC handles these values in step 511. After reflecting the stored UI state in the updated UI page in step 512, the RUIC finally renders the UI state-reflected UI page on a web browser in step 513, completing the update of the UI page.

If the response received in step 507 does not include an updated UI, the RUIC ends the update operation, determining in step 508 that there is no need for the update.

Figure 6:
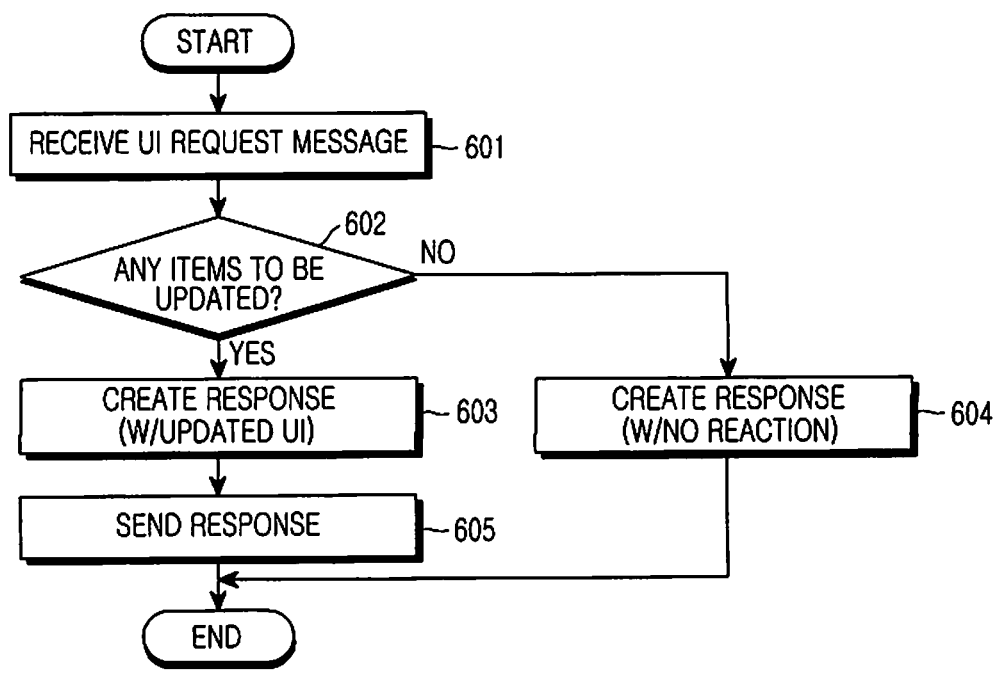
FIG. 6 a flowchart illustrating an operation of an RUIS according to the first embodiment of the present invention.

FIG. 6 illustrates an operation of an RUIS according to the first embodiment of the present invention.

Referring to FIG. 6, the RUIS receives a UI request message including changed capability information from an RUIC in step 601, and determines in step 602 whether there are any items to be updated in the requested UI based on the changed capability information. If there are items to be updated, the RUIS updates the UI and generates a response message including the updated UI in step 603, and sends the response message to the RUIC in step 605. However, if there are no items to be updated or if the update is impossible, the RUIS generates an error response message indicating that an update is unnecessary or impossible in step 604, and sends the error response message to the RUIC in step 605.

Figure 7:
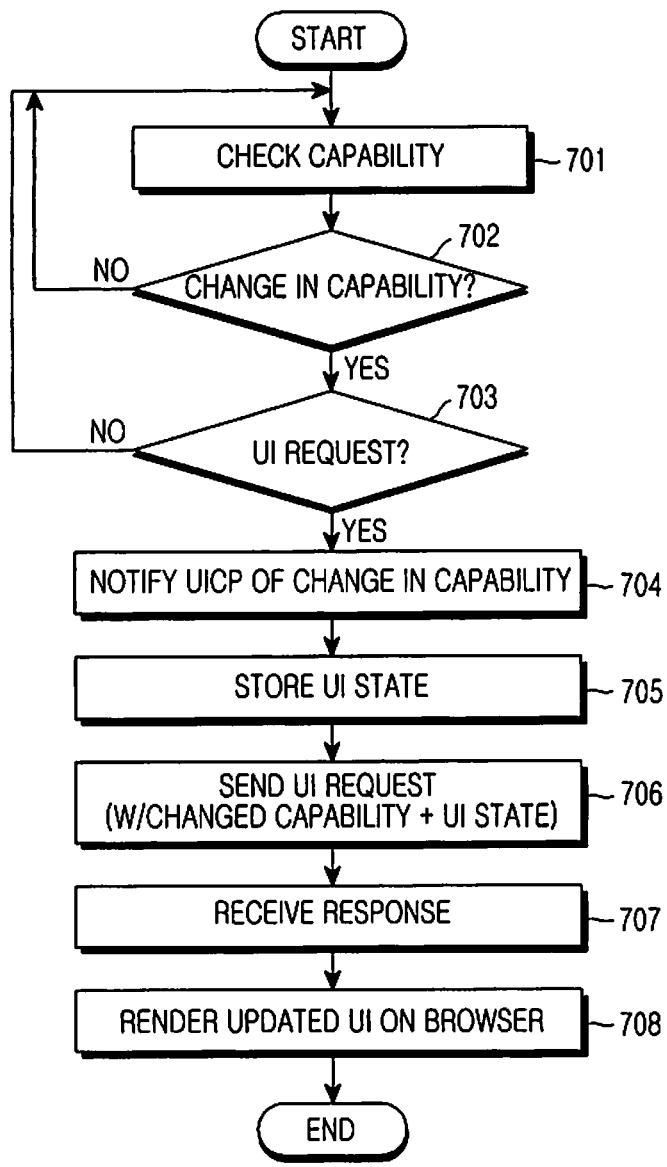
FIG. 7 is a flowchart illustrating an operation of an RUIC according to a second embodiment of the present invention.

FIG. 7 illustrates an operation of an RUIC according to the second embodiment of the present invention.

Referring to FIG. 7, the RUIC checks for any change in capability in step 701. Upon detecting a change in capability in step 702, the RUIC determines, in step 703, whether to update the UI to match the changed capability. If it is determined that the UI must be updated, the RUIC notifies a UICP of the changed device capability in step 704, and stores the current UI state information in step 705. In step 706, the RUIC sends a re-request for a UI page to an RUIS using the changed device capability information and the UI state information. If there is no change in capability in step 702 or if there is no need to update the UI in step 703, the RUIC returns to the beginning of the processing.

The RUIC receives a UI state-reflected updated UI page as a response to the UI request in step 707, and renders the received UI page on a web browser in step 708, completing the update of the UI page.

Figure 8:
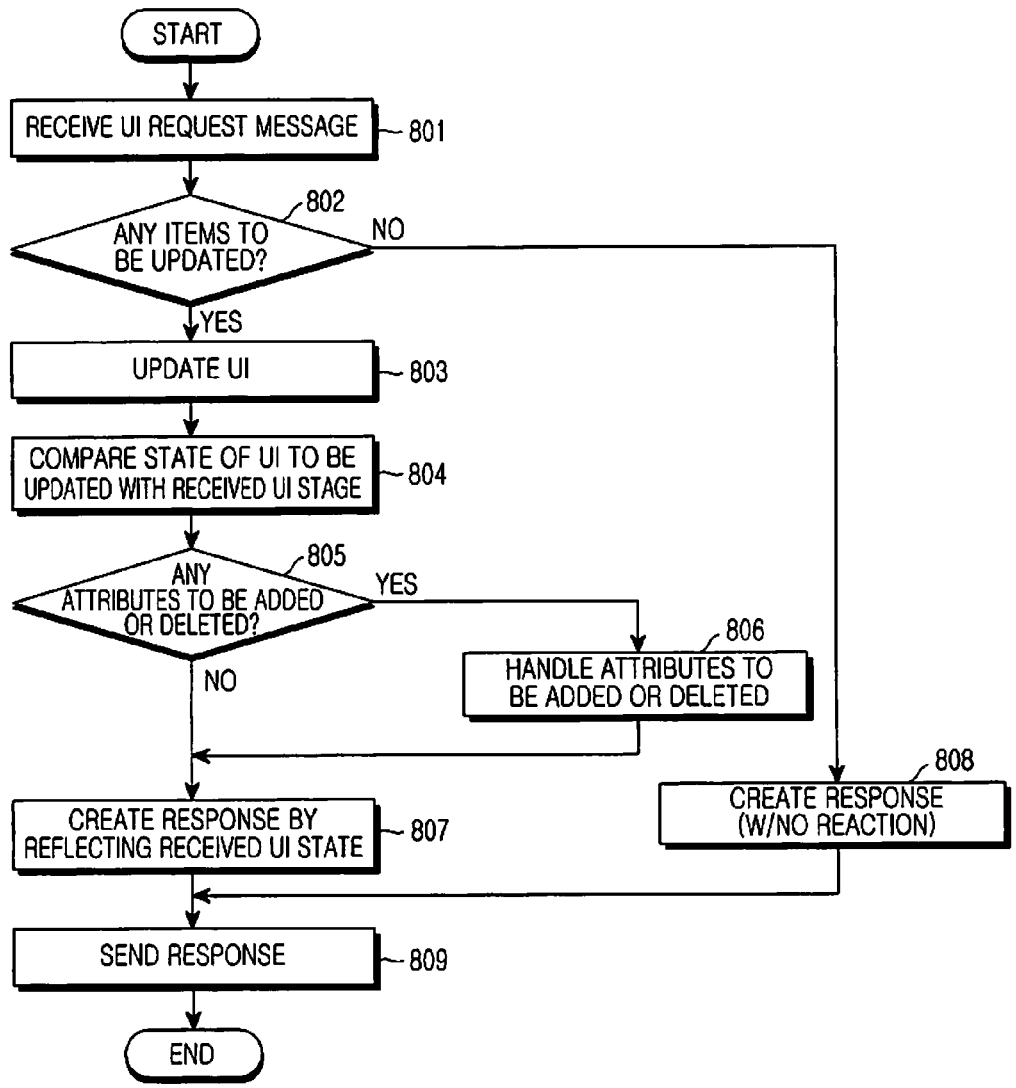
FIG. 8 a flowchart illustrating an operation of an RUIS according to the second embodiment of the present invention.

FIG. 8 illustrates an operation of an RUIS according to the second embodiment of the present invention.

Referring to FIG. 8, the RUIS receives a UI request message including changed capability information and UI state information, from an RUIC in step 801, and determines in step 802 whether there are any items to be updated in the requested UI. If there are items to be updated, the RUIS updates the UI based on the changed capability information in step 803, and compares a state of the UI to be updated with the UI state information received from the RUIC in step 804. The RUIS determines in step 805 whether there are any attributes to be added or deleted, and if there are attributes to be added or deleted, the RUIS handles these values in step 806, generates a response to the UI request message by reflecting the UI state received from the RUIC in the updated UI page in step 807, and sends the response to the RUIC in step 809. However, if there are no items to be updated or the update is impossible in step 802, the RUIS generates an error response message indicating that an update would be unnecessary or impossible in step 808, and sends the error response message to the RUIC in step 809.

Figure 9:
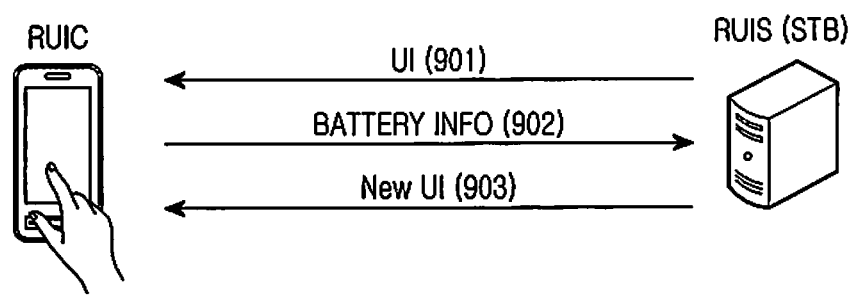
FIG. 9 is a diagram illustrating an example of an application of the present invention.

FIG. 9 illustrates an example of an application of the present invention.

Referring to FIG. 9, if a Set-Top Box (STB) serves as an RUIS providing an XHTML-based RUI(s) and a cell phone serves as an RUIC, the cell phone receives an RUI created in XHTML from the STB in step 901. If normal content consumption is a big burden due to a very low battery state of the cell phone during its use, conventionally, the user should re-request the UI page from the beginning to download a UI page compatible with the new capability, and, at this moment, the state of the UI page is initialized. For example, as the UI page is updated while the user is viewing a movie, the movie is played again from the beginning. However, according to the embodiments of the present invention, the RUIC stores its UI state and then sends a re-request for a UI page to the RUIS along with the battery information in step 902, and upon receiving a new UI corresponding to the changed battery information from the RUIS in step 903, the RUIC reflects the stored UI state in the received UI page and renders the UI state-reflected UI page, enabling the user to view the movie continuously.

As is apparent from the foregoing description, upon a change in capability of an RUIC in the RUI environment, the present invention dynamically updates the UI page, thereby naturally or smoothly changing the UI state so as to be unrecognizable by the user, and providing the user with the UI that is updated in response to the change in device capability.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for updating a User Interface (UI) by a Remote UI (RUI) client in an RUI system providing a UI, comprising:
   requesting a RUI server to update a UI page in response to detecting a change in capability of the RUI client;
   receiving, from the RUI server, a new UI page updated based on the changed capability of the RUI client;
   comparing a UI state of the new UI page with a UI state of the UI page;
   if there are attributes to be added or deleted based on a result of the comparison, adding or deleting the attributes in the new UI page; and
   rendering the new UI page.

2. The method of claim 1, wherein requesting the RUI server to update the UI page comprises:
   transmitting the changed capability of the RUI client to the RUI server.

3. The method of claim 1, further comprising:
   determining whether an update of the UI page is required based on the changed capability of the RUI client,
   wherein, if an update of the UI page is required, the step of requesting the RUI server to update the UI page is performed.

4. The method of claim 1, wherein the changed capability of the RUI client comprises a change in state information of at least one of a Central Processing Unit (CPU), a Graphic Processing Unit (GPU), a memory, a network, and a battery of the RUI client.

5. The method of claim 2, wherein requesting the RUI server to update the UI page comprises:
   transmitting both the changed capability of the RUI client and an old capability to the RUI server.

6. The method of claim 1, wherein rendering comprises:
   parsing the new UI page, re-requesting the RUI server to provide elements to be updated, and receiving the re-requested elements; and
   merging the elements received from the RUI server with the UI state of the UI page, and rendering the merged UI page.

7. A method for updating a User Interface (UI) by a Remote UI (RUI) server in an RUI system providing a UI, comprising:
   receiving, from an RUI client, an update request for a UI page, where the update request includes a changed capability of the RUI client and a UI state of the UI page when the RUI client detected the changed capability of the RUI client;
   determining whether there are items to be updated in the UI page in response to the changed capability of the RUI client; and
   if there are items to be updated:
      updating the UI page based on the changed capability of the RUI client,
      applying the UI state included in the update request to the updated UI page by comparing a UI state of the updated UI page with the UI state included in the request and, if there are attributes to be added or deleted based on a result of the comparison, adding or deleting the attributes in the updated UI page, and
      transmitting the UI-state-applied updated UI page to the RUI client.

8. The method of claim 7, wherein the changed capability of the RUI client comprises change in state information of at least one of a Central Processing Unit (CPU), a Graphic Processing Unit (GPU), a memory, a network, and a battery of the RUI client.

9. A Remote User Interface (RUI) client apparatus for updating a User Interface (UI) in an RUI system providing a UI, comprising:
   a web browser which requests an RUI server to update a UI page in response to detecting a change in capability of an RUI client, receives a new UI page updated based on the changed capability of the RUI client from the RUI server, and renders the new UI page; and
   a controller that compares a UI state of the new UI page with a UI state of the UI page stored in a UI state storage and, if there are attributes to be added or deleted based on a result of the comparison, adds or deletes the attributes in the new UI page, and transmits the new UI page to the web browser.

10. The apparatus of claim 9, wherein the controller transmits the changed capability of the RUI client to the RUI server when requesting the RUI server to update the UI page.

11. The apparatus of claim 9, wherein the controller determines whether an update the UI page is required based on the changed capability of the RUI client, and requests the RUI server to update the UI page based on the changed capability of the RUI client if an update of the UI page is required.

12. The apparatus of claim 9, wherein the controller detects a change in state information of at least one of a Central Processing Unit (CPU), a Graphic Processing Unit (GPU), a memory, a network, and a battery of the RUI client.

13. The apparatus of claim 10, wherein the controller transmits both the changed capability of the RUI client and a capability prior to a change thereof to the RUI server.

14. A Remote User Interface (RUI) server apparatus for updating a User Interface (UI) in an RUI system providing a UI, comprising:

a web server which receives an update request from an RUI client for a UI page, and sends a response to the update request to the RUI client, where the update request includes a changed capability of the RUI client and a UI state of the UI page when the RUI client detected the changed capability of the RUI client; and a controller that determines whether there are items to be updated in the UI page in response to detecting a change in capability of the RUI client, updates the UI page based on the changed capability of the RUI client if there are items to be updated, applies the UI state included in the update request to the updated UI page by comparing the UI state of the updated UI page with the UI state included in the update request and, if there are attributes to be added or deleted based on a result of the comparison, adding or deleting the attributes in the updated UI page, and delivers the UI-state-applied UI page to the web server.

15. The apparatus of claim 14, wherein the changed capability of the RUI client comprises a change in state information of at least one of a Central Processing Unit (CPU), a Graphic Processing Unit (GPU), a memory, a network, and a battery of the RUI client.

\* \* \* \* \*